United States Patent [19]

Shulzhenko et al.

[11] 4,253,411
[45] Mar. 3, 1981

[54] MACHINE FOR TRANSPLANTING SEEDLINGS FROM COILED CASSETTES

[76] Inventors: Boris A. Shulzhenko, Blagoveschensky pereulok, 10, kv. 33; Evgeny A. Belyaev, ulitsa Molodogvardeiskaya, 6, kv. 10; Jury N. Lipov, ulitsa Vavilova, 56, korpus 2, kv. 167; Igor N. Egorov, ulitsa Preobrazhenskaya, 5/6, kv. 183, all of Moscow; Georgy A. Mikaelian, Novo-Mytischinsky prospekt, 82, kv. 93, Mytischi, Moskovskaya oblast; Leonid S. Zemlyanov, ulitsa Solnechnogorskaya, 10, kv. 15; Anatoly F. Krutkov, ulitsa S. Kovalevskoi, 2, korpus 4, kv. 40, both of Moscow, all of U.S.S.R.

[21] Appl. No.: 972,358

[22] Filed: Dec. 22, 1978

[51] Int. Cl.³ ............................................ A01C 11/02
[52] U.S. Cl. ............................................ 111/2; 111/3; 198/654
[58] Field of Search ..................... 198/654; 111/2, 3

[56] References Cited

U.S. PATENT DOCUMENTS 3,719,158 3/1973 Roths ........................................ 111/2
4,167,910 9/1979 Pretzer ...................................... 111/3

FOREIGN PATENT DOCUMENTS 78162 10/1947 Norway ........................................ 111/3
393982 12/1973 U.S.S.R. ...................................... 111/2

Primary Examiner—Steven A. Bratlie
Attorney, Agent, or Firm—Lackenbach, Lilling & Siegel

[57] ABSTRACT

The present invention includes a platform with a cassette for seedlings which is vertically arranged on a frame, and provided with an inclined groove for retaining the cassette the coils of which are engaged throughout the entire length. A roller is provided at the zone of opening of the cassette cells at which location gripping of the seedlings by a planting unit is effected. The roller has a vertical axis of rotation and adjoins a guide member provided with a helical groove.

4 Claims, 3 Drawing Figures

MACHINE FOR TRANSPLANTING SEEDLINGS FROM COILED CASSETTES

BACKGROUND OF THE INVENTION

The present invention relates to agricultural machines and, more particularly, it relates to machines for transplanting seedlings from coiled cassettes.

This invention can be used for the purposes of transplanting seedlings of the various crops whose root system is embedded in a lump of nutritious substrate. The present invention can be used most advantageously for transplanting seedlings grown directly in coiled cassettes. The invention can be also used for transplanting sugar beet, potato, onion and other crops let to germinate in the cassette.

DESCRIPTION OF THE PRIOR ART

A number of machines for transplanting seedlings are known in the art.

One prior art machine for transplanting seedlings comprises a frame with supporting drive wheels, to which are pivotally mounted planting sections including a colter, a rotor-type planting unit, soil-packing rollers, a platform with containers for seedlings and an operator's seat.

Said prior art machine operates as follows. In the course of the machine movement across the field, the operator takes seedlings from the container and places them by-the-piece in the grips of the planting unit which transfers the seedlings to a furrow opened up by the colter. In the zone of planting the grips of the planting unit open up to release the seedlings while the soil-packing rollers cover the furrow with soil and pack it around the root system of the seedlings.

The main disadvantage of said prior art machine for transplanting seedlings resides in the absence of a device for mechanized feed of the seedlings from the container to the grips of the planting unit. The use of the operator's manual labor to perform this operation limits the translational velocity of the machine, as a result of which its productivity does not exceed 35-45 seedlings a minute per each row.

There are also known machines for transplanting seedling wherein the container for seedlings is fashioned as a band with partitions rolled in a coiled reel such as a cassette. The coiled cassette is pre-filled with seedlings. The machine comprises a frame with supporting drive wheels, planting sections pivotally connected thereto and including a colter, a platform with a coiled cassette, a roller mounted above the colter neck and a band-transport mechanism with a takeup reel.

No manual labor is involved in the operation of this latter machine. During the machine movement the band-transport mechanism synchronously rewinds the band from the cassette onto the take-up reel at a translational velocity while the band with seedlings contained between the band partitions bends round the roller. As a result of the band bending around the roller, the space between the band partitions increases and the seedlings fall by gravity into the colter neck. During the free fall of the seedlings, the leaves of their stems interact with the colter neck walls, as a result of which the seedlings take up a vertical position in which they reach the bottom of the furrow opened up by the colter. The soil behind the colter covers up the furrow and the root system of the seedlings contained therein. The coiled cassette relieved of seedlings is removed from the take-up reel, the band ends are secured on the coils and the band is fed for re-charging with seedlings, after which the planting process is repeated.

Said prior art machine for transplanting seedlings from coiled cassettes is mainly disadvantageous in that the transfer of seedlings from the cassette band to the furrow bottom has no rigid kinematic link with the translational velocity of the machine. As a result, the quality of planting is affected by the various random factors such as fanning of seedling leaves, the adhesion of the seedlings to the cassette material, inertia forces at the moment of impact against the furrow bottom.

There is further known a prior art machine for transplanting seedlings from coiled cassettes, comprising a platform with a coiled cassette, secured to a frame, a member for guiding a band with seedlings onto a roller located in the zone of opening of cassette cells and of gripping of seedlings by a planting unit, and further guiding the band onto a take-up reel. The planting unit is made as a rocking beam with a grip at the end.

This latter prior art machine operates in the following manner.

A coiled cassette with seedlings is placed on the platform disk, the external end of the band is disconnected from the cassette and passed through the guide member with roller to be attached to the take-up reel. In the course of planting, the band with seedlings is fed synchronously onto the roller at a translational velocity of the machine, passes around said roller while releasing the seedlings from the cells and is wound onto the take-up reel, while the seedlings are gripped by their root portions by the planting unit and planted in the soil.

A structural disadvantage of the latter prior art machine consists in the horizontal position of the platform with the cassette which makes it difficult to provide a multi-row machine wherein the distance between rows would be less than the diameter of the coiled cassette.

Another disadvantage of said prior art machine resides in the use of a planting unit provided with a reciprocating grip, said reciprocation reducing the time of useful work, i.e., time during which the seedlings are gripped and planted, as compared with the prior art unidirectional rotor-type planting unit. As a result, one cannot increase the planting rate and, consequently, the machine output, due to the effect of high inertia loads upon seedlings, capable of damaging their stems and leaves.

SUMMARY OF THE INVENTION

It is the primary object of the present invention to ensure uniform planting of seedlings from coiled cassettes at a production rate in excess of 300-400 seedlings a minute per row.

It is another object of the invention to preclude the shifting of the cassette coils upon the vertical position of the cassette on the machine platform.

It is a further object of this invention to improve the coiled cassette design such as to ensure its further utilization without additional rewinding after transplanting the seedlings from the cassette.

And, an object of the present invention is to facilitate the mounting of the coiled cassette on the machine for transplanting seedlings.

Said and other objects of the invention are accomplished by a machine for transplanting seedlings from coiled cassettes fashioned as a perforated band with partitions defining cells for seedlings, comprising a frame-mounted platform to support the cassette, said platform mated with a member adapted to guide the band to a roller located in the zone where the cassette cells are opened and the seedlings are gripped by a planting unit. According to the present invention, the platform with the cassette is vertically mounted on the frame and provided with an inclined groove for retaining the cassette whose coils are engaged throughout their entire length. A roller having a vertical rotation axis adjoins the guide member provided with a helical groove.

It is expedient that the engagement of the cassette coils be effected by means of projections provided on the band partitions.

It is also expedient that the end portions of the coiled cassette be provided with stops receivable in the band perforations.

According to one of the embodiments of the invention, the helical groove is formed by two plane-parallel plates.

The platform can be fashioned as a tray for carrying the cassettes with seedlings.

The present invention includes the following.

With a view to ensuring a multi-row arrangement in the machine for transplanting seedlings from coiled cassettes with a distance between the rows considerably less than the cassette diameter, the platform with coiled cassette is vertical or nearly vertical. To retain the cassette in such position, the platform is provided with an inclined groove in which the cassette core is accommodated and allows for movement with respect to the platform.

In order to preclude the shifting of the cassette coils in the vertical position, projections are provided on the partitions of the cassette band, between which the band coils are received. Such a partition design does not obstruct the rewinding of the cassette band during plating and, at the same time, provides for reliable engagement of the cassette coils with each other over the entire length thereof.

In addition, the cassette band with partitions is made symmetrical relative to the middle point thereof while the band ends are provided with stops receivable in the band peforations. Such a design of the cassette band makes for the possibility of re-using an empty coiled cassette removed from the machine, without additional rewinding.

With a view to improving the uniformity of gripping the seedlings by the rotor-type planting unit and protecting them from damage, the seedlings are gripped by the stronger portion of their stems free of branched leaves, in a position with the stem facing downwards, which is ensured by the design of the guide member provided with the helical groove for the passage of the stems of seedlings and for turning the seedlings from the horizontal position to the vertical one, with the root facing upwards.

For ensuring the reliability of operation of the guide member and simplifying its design, the helical groove is made, for example, in the form of two plane-parallel plates between which the band with seedlings passes, while at the outlet from the plates a roller is provided having a vertical axis of rotation and serving to bend the cassette band, as a result of which the space between the partitions increases and the seedlings held by their stems by the grip of the planting unit are easily removed by the latter from the cassette band and fed to the furrow opened up by the colter.

With a view to facilitating the mounting of the cassette with seedlings on the machine, the platform for the cassette is made in the form of a portable tray serving, on the one hand, as a rack shelf for transporting the cassettes with seedlings and conveying them to the machine and, on the other hand, as a platform for supporting the cassette with seedlings on the machine.

Such a design of the present invention facilitates a multi-row arrangement of the machine with a distance between rows considerably less than the cassette diameter, reduces the consumption of labor when recharging the machine with cassettes with seedlings, helps reliably retain the cassette with seedlings on the platform, precludes the shifting of the cassette coils upon vertical position of the cassette on the machine, improves the uniformity of planting the seedlings at higher operating velocities, and protects the seedlings from damage.

Another advantage of the present invention resides in the fact that the coiled cassette serves a multipurpose function, i.e., it provides for normal growing of seedlings in its cells, as well as serves a container for transporting the seedlings and, finally, rules out the use of manual labor in the machine for transplanting seedlings. Therefore, the herein disclosed machine for transplanting seedlings from coiled cassettes helps cultivating crops by planting seedlings.

BRIEF DESCRIPTION OF THE DRAWINGS

The present invention will be more apparent upon considering the following detailed description of the preferred embodiment thereof, with due regard for the accompanying drawings in which.

DETAILED DESCRIPTION OF THE INVENTION

Figure 1:
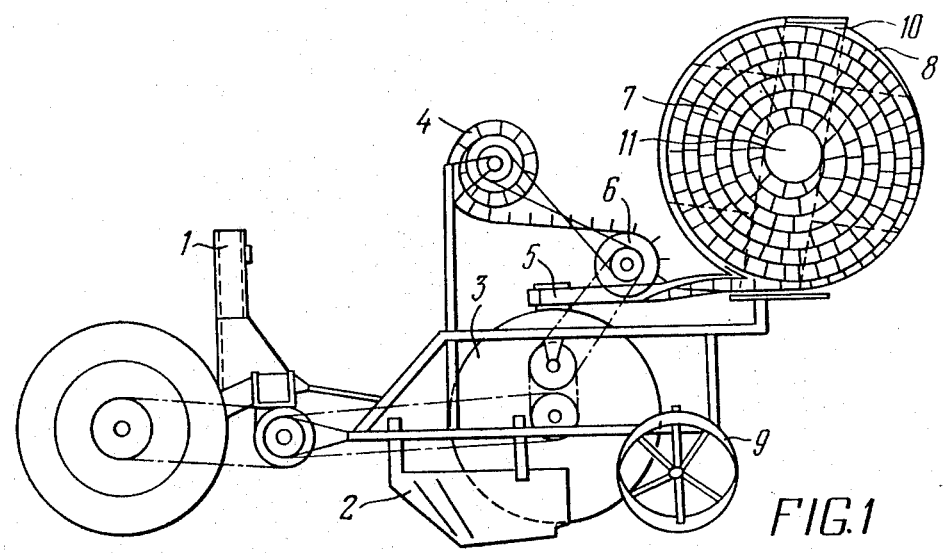
FIG. 1 is a side elevation of the machine for transplanting seedlings from coiled cassettes according to the present invention.

Referring now to FIG. 1 of the accompanying drawings, the machine for transplanting seedlings from coiled cassettes, according to the invention, comprises a frame 1 with supporting drive wheels, to which planting sections are pivotally attached including a colter 2, a rotor-type planting unit 3, a take-up reel 4, a guide member 5, a band-transport drum 6, a coiled cassette 7, a platform 8 for the cassette and soil-packing rollers 9. The platform is made in the form of a portable tray and provided with an inclined groove 10 for a core 11 of the cassette 7 to slide therein.

Figure 2:
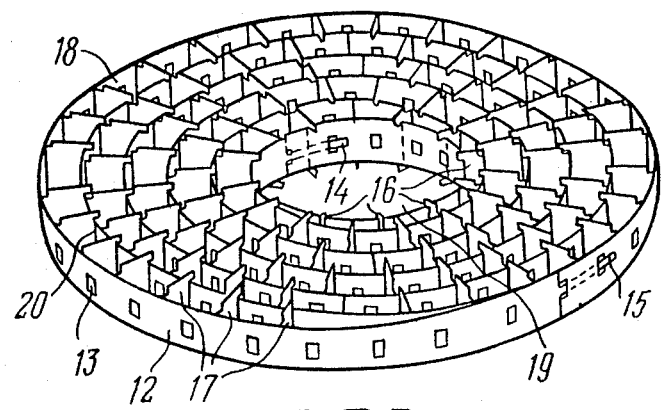
FIG. 2 is a perspective view of a coiled cassette according to the invention.

The coiled cassette (FIG. 2) includes a flexible band 12 with perforations 13, end portions provided with stops 14 and 15 and partitions 16 and 17 of variable height. The coiled arrangement of the band with partitions helps form cells 18 and an inner hole 19. The partitions of the band 12 are provided with projections 20 ensuring the engagement of the coils of the cassette 7.

The guide member (FIG. 3) is made up of two plane-parallel plates 21 and 22 defining a helical groove 23. Pivotally secured on one end of the plate 21, say, the left-hand one, is a roller 24 having a vertical axis of rotation, the other end of said plate serving to support the coiled cassette 7 in its vertical position on the machine.

The machine for transplanting seedlings from coiled cassettes, according to the present invention, operates in the following manner.

Figure 3:
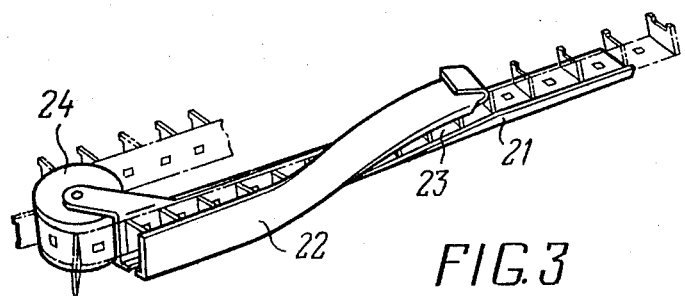
FIG. 3 is a perspective view of one of the embodiments of the guide member of the machine according to the present invention.

The coiled cassette 7 with seedlings is placed on the tray which also serves as the platform 8 for supporting the cassette with seedlings, and is transported to the machine in the field. After that, the tray-platform 8 with the cassette 7 is mounted on a planting section, the cassette with seedlings being held in the vertical position by the core 11 and resting against the plate 21 of the guide member 5. The external end of the cassette is disconnected, for which purpose the stop 15 is withdrawn from perforations 13. On having passed the end of the band 12 through the guide member 5 and roller 24, as shown in FIG. 3, it is attached to the take-up reel 4. After the cassettes with seedlings have been thus mounted on all of the planting sections, planting is commenced. During the movement of the machine, the band-transport drum 6 rewinds the band 12 of the cassette 7 onto the take-up reel 4 at a preset rate which is in kinematic relationship with the machine velocity. The seedlings disposed between the partitions of the cassette band are transferred with the aid of the guide member 5 from the horizontal position in the cassette 7 to the vertical position at the outlet, with the roots upwards. When the cassette band bends around the roller 24, the seedlings are released from the partitions and gripped by the converging disks of the rotor-type planting unit 3 which transfers the seedlings to the furrow opened up the colter 2. At the point of planting, the disks diverge to release the seedling stems while the soil-packing rollers 9 cover the furrow and pack the soil around the root system of seedlings.

The planting process continues until all of the cassette band is rewound onto the take-up reel. Then the empty cassette is removed, the external and internal ends of the cassette band are secured in place and the cassette is directed for re-use. Another cassette with seedlings is mounted on the machine and the planting process continues.

The herein disclosed machine for transplanting seedlings from coiled cassettes makes for high-quality planting of seedlings at a rate of over 300 seedlings a minute per each row. In so doing, the root system of the seedlings is almost fully preserved, which obviates the need for a prolonged period of taking root and, consequently, reduces the time of maturing of the crops.

The invention is further advantageous in that it can be used for planting in a pre-determined succession the various crops such as sprouting potatoes, onion, beet etc., which enables one to pre-charge the cassette cells with seeds in the desired order of succession.

The main advantage of the present invention resides in the possibility of effecting an overall mechanization of growing, selecting and planting seedlings, i.e., utilizing industrial methods of labor when cultivating crops by planting.

What is claimed is:

1. An apparatus for transplanting seedlings from coiled cassettes, comprising: a movable frame, a platform mounted on said frame, a cassette havng two end portions structured as a band having a plurality of perforations and having a plurality of spaced partitions defining cells for seedlings, said platform mountable vertically on said frame and provided with an inclined groove for retaining said cassette, the edge of said partitions engaging said band intermittently throughout its entire length when in a coiled configuration, a guide member mated with said platform having a helical groove therein, a roller pivotally secured to said guide member located at one end therein, said roller having a vertical axis of rotation, a planting unit for gripping seedlings from the cells of said cassette disposed under the location of said roller, said partitions having two projections on the edge opposite said band, said projections spaced apart a distance greater than the width of said band.

2. An apparatus as set forth in claim 1, wherein the end portions of the coiled cassette each have an elongated stop receivable within the band perforations.

3. An apparatus as set forth in claim 1, wherein the helical groove is formed by two plane-parallel plates.

4. An apparatus as set forth in claim 1, wherein the platform is fashioned as a tray for carrying the cassette with seedlings.

* * * * *